(No Model.) 3 Sheets—Sheet 2.

J. W. HYATT.

APPARATUS FOR PURIFYING FILTER BEDS.

No. 362,839. Patented May 10, 1887.

Attest:
L. Lee.
Henry J. Theberath.

Inventor
John W. Hyatt
Crane & Miller Attys.

(No Model.) 3 Sheets—Sheet 3.
J. W. HYATT.
APPARATUS FOR PURIFYING FILTER BEDS.
No. 362,839. Patented May 10, 1887.
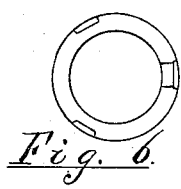
Fig. 6.
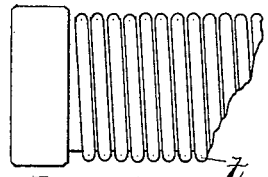
Fig. 5.
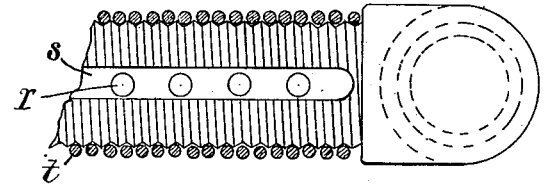
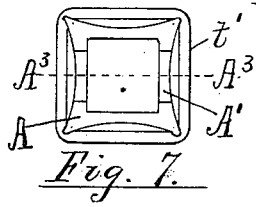
Fig. 7.
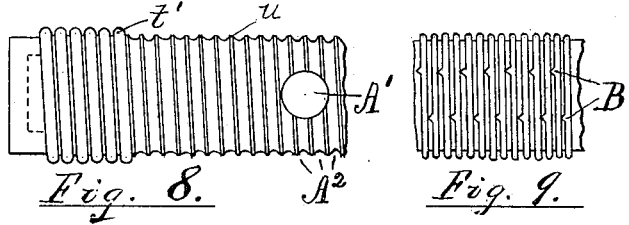
Fig. 8.     Fig. 9.
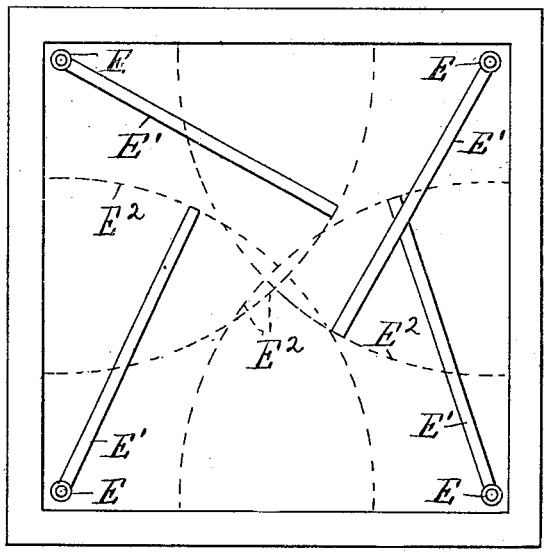
Fig. 10.
Attest:
L. Lee.
Henry J. Theberath.
Inventor.
John W. Hyatt
per Crane & Miller, Atty.

UNITED STATES PATENT OFFICE.

JOHN W. HYATT, OF NEWARK, NEW JERSEY, ASSIGNOR TO THE NEWARK FILTERING COMPANY.

APPARATUS FOR PURIFYING FILTER-BEDS.

SPECIFICATION forming part of Letters Patent No. 362,839, dated May 10, 1887.

Application filed October 21, 1886. Serial No. 216,818. (No model.)

*To all whom it may concern:*

Be it known that I, JOHN W. HYATT, a citizen of the United States, residing at Newark, Essex county, New Jersey, have invented certain new and useful Improvements in Apparatus for Purifying Filter-Beds, fully described and represented in the following specification, and the accompanying drawings, forming a part of the same.

This invention relates to such filters as employ a bed of comminuted material, through which the filtration is effected by passing the current of water downward, and in which the cleansing of the bed is effected by reversing the current and forcing it upward through the bed; and my improvements consist partly in the means for directing the full force of the current downward in the lowest parts of the bed, and permitting the same thereafter to rise past the outlet-pipes to the surface of the bed to discharge the impurities therefrom, and partly in the details of construction hereinafter described and claimed.

Figure 1:
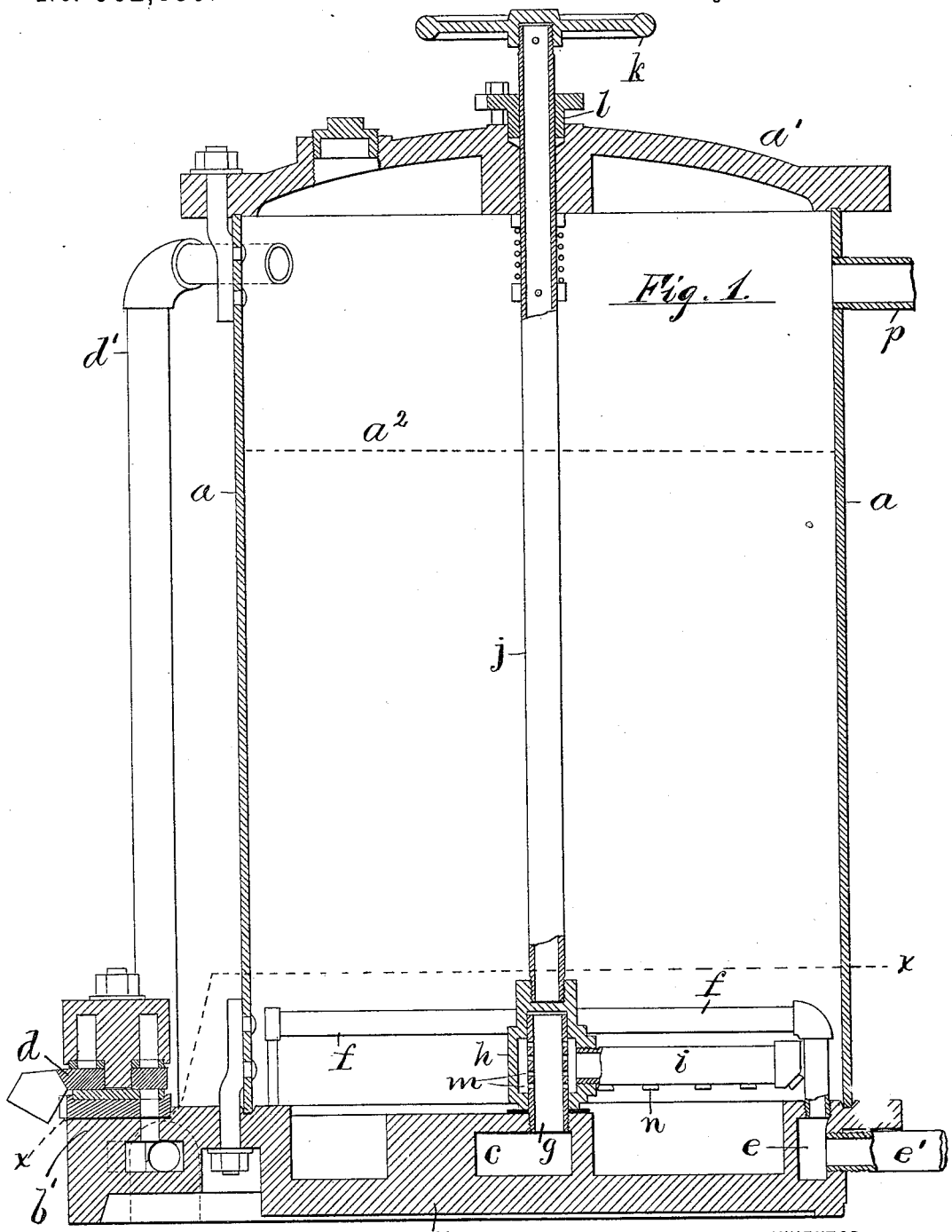
Figure 2:
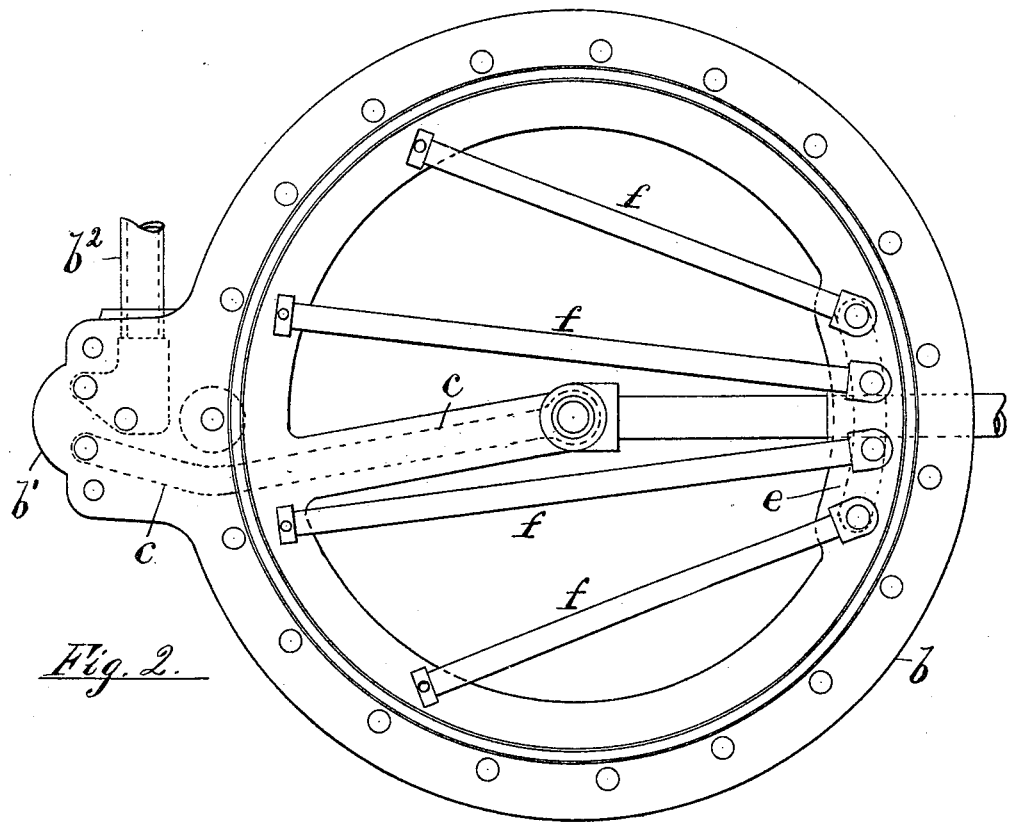
Figure 3:
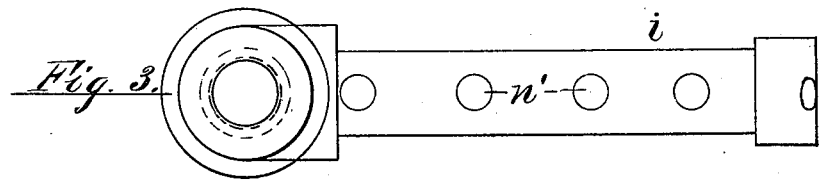
Figure 4:
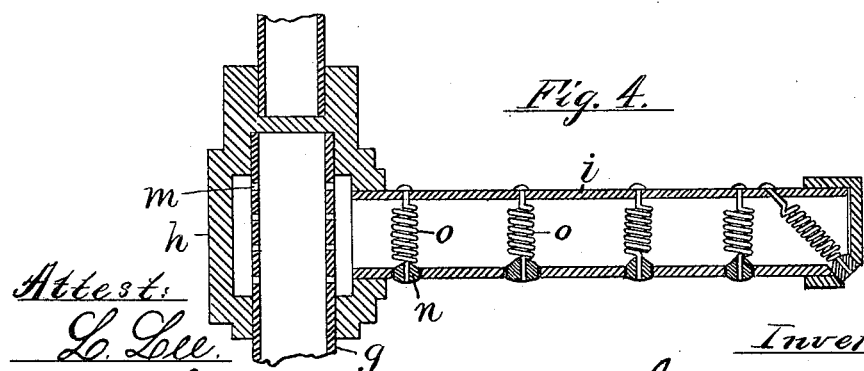

In the drawings, Figure 1 is a central vertical section of an upright cylindrical filter provided with my improvements. Fig. 2 is a horizontal section of the same, with the washer-arm omitted, on line $x\ x$ in Fig. 1. Fig. 3 is a view of the under side of the washer-arm. Fig. 4 is a central vertical section of the same with part of the turning shaft. Fig. 5 is a plan of one of the outlet strainer-pipes with portion of the spiral wrapping removed. Fig. 6 is a section of said pipe. Figs. 3 to 6, inclusive, are upon a larger scale than the other figures. Fig. 7 is an end view, and Fig. 8 a side view, of an alternative construction for the strainer-pipes. Fig. 9 is a view of portion of the strainer-pipe wrapped with corrugated or bent wire, and Fig. 10 is a diagram showing the application of radial washer-arms to a square filter-bed.

The construction of the rotary washer-arm and the means of applying water thereto during the washing operation are illustrated in its application to a cylindrical filter within a casing.

In Figs. 1 and 2, $a$ is the body of the filter, of upright cylindrical form, provided with cover $a'$, and filled to the line $a^2$ with sand or equivalent material. $b$ is a cast-iron base attached to the casing $a$, and provided with suitable internal channels for the entering and leaving fluid. $b'$ is a seat attached to the same for an oscillating valve to divert the current of unfiltered water either into the top or bottom of the filter, as required. Such valve is fully described in my Patent No. 293,742, and its construction is not therefore shown in detail herein.

$b^2$ is the water-supply pipe, which, by the aid of the valve $d$, may be diverted either into the inlet-pipe $d'$, which discharges the water into the upper part of the casing $a$, above the bed $a^2$, or into a channel, $c$, leading to the center of the bed, where it connects with the washing devices. A channel, $e$, is formed in the bed to receive the filtered water and discharge it to the pipe $e'$, and the several outlet strainer-pipes $f$ are connected, respectively, with the channel $e$, and extended horizontally across the interior of the casing a little distance above the base $b$. A sleeve, $g$, projects upward from the center of the bed in connection with the channel $c$, and is fitted to the interior of the hub $h$, to which the washer-arm $i$ is attached and swept around between the base and the pipes $f$ by a shaft, $j$, which is extended upward through the filter-bed and cover $a'$, and is provided with a hand-wheel, $k$, at its upper end, and with a stuffing-box, $l$, in the cover $a'$.

When the valve $d$ is turned to direct a current of water into the channel $c$, an annular space in the hub $h$ is filled with the fluid through openings $m$ in the sleeve $g$, and the fluid thus passes continuously into the washer-arm $i$, which consists in a hollow pipe closed at the outer end and provided upon its under side with a series of apertures having check-valves $n$. These valves are held movably within round apertures $n'$ in the under side of the pipe $i$ by springs $o$, attached to the inner sides of the valves and to the opposite side of the pipe. The valves are made to fit loosely within the hole and rest upon the spring, as at $n^2$.

When the valves are forced open by the entering fluid, the latter escapes downward in jets among the sand in the bottom of the filter, and one of the valve-openings is formed at an angle at the outer end of the pipe to discharge the fluid outward as well as downward to reach the sand in the exterior corner of the base b.

It is obvious that if the arm i remains stationary when the water is thus admitted the sand immediately beneath the same would be violently agitated and the water would boil up through the superincumbent portion of the bed. Such movement of the water upward through a limited part of the bed serves effectually to purify such portion, and to carry off the impurities therefrom to the waste-pipe provided at p, which would be provided with a cock to be opened during such washing operation. The loosening of the sand adjacent to the arm i would, however, permit of its gradual movement in a radial position through the entire base of the filter-bed, to effect which the shaft j and hand-wheel k are provided, the wheel serving to turn the arm successively beneath every part of the bed, and to thus subject every part thereof successively to the required washing. When the valve d is turned to cut off the water-supply from the washer-arm, the valves are pressed elastically to their seats by their construction to prevent the interior of the washer-pipes and channel from being clogged with sand.

It is obviously immaterial how the sleeve g and hub h are fitted to one another, provided the water is delivered from the sleeve to the hub, while one is stationary and the other rotary, so as to turn the arm i around within the filter-bed.

The strainer outlet-pipes f are constructed in a peculiar manner to obviate the use of netting or perforated screens, or any construction possessing loose parts, as is clearly shown in Figs. 5 and 6. The pipes f are provided with several rows of holes, r, and with grooves s, extending along the surface of the pipe between such holes. The pipe is wrapped externally with a continuous spiral wire, t, which is shown only at the outer end of the pipe to expose the holes and grooves to view, leaving minute spaces between the successive coils of the wire, through which the fluid can pass into said grooves and holes.

To wrap the wire uniformly about the pipe and secure the narrow spaces desired, I preferably form a screw-thread, u, upon the exterior of the pipe, of pitch a little greater than the diameter of the wire, making the screw-thread, for instance, thirty to the inch, while the diameter of the wire may be one-fortieth of an inch. The wire may be readily wound upon the pipes while the latter are rotated in the lathe where the screw-thread would be formed, and when thus wound may be readily secured to the surface of the pipe between the rows of holes by solder, so that every coil is separately attached to the pipe, and the breakage and derangement of one would not affect the others. It will be seen that with this construction the grooves s form channels inside the wire wrapping which communicate with all the holes r, so that the minute spaces between the wires t may all be equally effective in conducting the water to such holes, and the whole construction, when used to discharge the purified water from the filter, effects such object without affording the sand or other filtering agent any access to the interior of the pipe, where it would be liable to settle and to clog up the channels.

Figs. 7 and 8 show another construction by which the holes in the strainer-arms may be connected by longitudinal grooves, and the wire wrapping properly spaced when wound over the same. In these views the pipe, as at A, is made with four exterior corners and hollowed sides, the holes A' being formed in the said sides and the corners being formed with notches A², in which the wire t' can be wrapped, as in a screw-thread. This construction is particularly adapted for all strainer-arms where a great volume of water is to be filtered, and in such case the arm would be divided at the line A³ A³, and the opposite halves could then be readily formed with the holes and corner notches complete by the simple process of casting.

In Fig. 9 a short piece of a strainer-arm is shown which would be formed with smooth exterior and provided with holes and grooves, as in Fig. 6; but the wire wrapped around the same would be provided at uniform intervals with projections B, formed by pressing the wire in a suitable die, which would cause the separation of the wires sufficiently to produce the narrow spaces desired.

The alternative constructions shown in Figs. 7 to 9, inclusive, are illustrated to show more fully the scope of my invention in respect to such strainers formed with wire wrapping.

It is obvious that it is immaterial to the operation of my washing devices whether the filter-bed to which it is applied be used for upward or downward filtration, as the violent agitation induced by my construction would remove the impurities from the water, in whatever part of the bed they had been deposited.

The pipes f, as shown in Fig. 2, are disposed over different portions of the base b, so as to draw the water from the entire lower part of the filter-bed; and it will be noticed that the current of water discharged from the washer-pipe i is compelled to pass upward between and around the various pipes f to make its escape from the upper part of the filter-bed. The entire body of sand in the filter is thus effectually cleansed during the washing operation, including that which lies in contact with the strainers upon the surfaces of the outlet-pipes, so that no part of the filtering medium is able to escape a thorough cleansing during the washing operation.

In Fig. 10 is shown a means for washing the entire area of a square or rectangular filter-bed by means of washer-arms swinging around vertical shafts. In this figure a vertical shaft, E, is shown located in each corner of the bed, with a washer-arm, E', projected therefrom to or beyond the center of the bed. The extremities of the washer-arms move in paths which intersect one another, as represented by the dotted lines E², and it is obvious that the area covered by the four arms thus includes the entire area of the bed, and that portion where the paths of the arms overlap would be subjected to an additional washing.

I am aware of Patent No. 243,212, issued to Patrick Clark June 21, 1881, in which a washer-arm provided with perforations upon its lower side, and rotated radially about a central pipe, is used to cleanse a filter-bed; and I am also aware of Patent No. 273,539, granted to me March 6, 1883, in which a series of washing-inlets are formed in the bottom of the bed and provided with automatically-operating check-valves, and I do not consider that my present invention can be operated without using the said prior inventions.

I am also aware of United States Patents Nos. 243,265, 293,745, and 293,747 previously issued to me, and showing various washer-pipes located beneath the outlet strainer-pipes, and various washer-pipes movable within the filter-bed and provided with perforations on their lower sides.

My object in devising the present constructions has not been to evade such patents or to avoid their use in any manner, but to further improve the art of filtering by furnishing more effective means for carrying out the invention already set forth and claimed in the said prior patents.

The above-mentioned patents are the property of The Newark Filtering Company, of New Jersey, which is also the assignee of my present application.

Having thus set forth the nature of my invention, what I claim herein is—

1. In a filtering device, a hollow radial washer-arm attached to a central hub, a shaft for rotating such hub, a stationary sleeve for introducing water into said hub and arm, holes in the under side of said arm, and valves seated externally upon the holes and held thereto by springs, the whole being arranged and operated substantially as herein set forth.

2. In a filtering device, the outlet strainer-pipes formed with rows of holes connected by grooves upon the surface of the pipe, and having wire wound over said holes and grooves, with suitable spaces between the several coils of the wire, as and for the purpose set forth.

3. In a filtering device, the outlet strainer-pipes formed with rows of holes connected by grooves upon the surface of the pipe, a screw-thread formed upon the exterior of the pipe, and a wire finer that the pitch of the thread wound in the same and secured to the pipe, substantially as herein shown and described.

4. In a filtering device, an outlet-strainer having its screen formed of a wire wound spirally upon a hollow support, the coils of the wire being separated by water-spaces, as described, and the interior of the support being provided with an inlet or outlet for the fluid, substantially as herein set forth.

In testimony whereof I have hereunto set my hand in the presence of two subscribing witnesses.

JOHN W. HYATT.

Witnesses:
SAML. S. TIFFANY,
THOS. S. CRANE.